3,795,743
METHOD OF CONTROLLING MITES USING CHLOROMETHANESULFONAMIDE
Itsuki Okuda, Shimizu, Hiroshi Shinohara and Haruki Ogawa, Ogasa, and Hideo Itoh, Shimizu, Japan, assignors to Kumiai Chemical Industry Co., Ltd., Tokyo, Japan
No Drawing. Continuation of abandoned application Ser. No. 13,204, Feb. 20, 1970. This application Mar. 15, 1973, Ser. No. 341,367
Claims priority, application Japan, Feb. 24, 1969, 44/13,772
Int. Cl. A01n 9/16
U.S. Cl. 424—321                1 Claim

ABSTRACT OF THE DISCLOSURE

A method for controlling mites by applying a miticidally effective amount of chloromethanesulfonamide to an area to be protected from mites.

---

This is a continuation of application Ser. No. 13,204 filed Feb. 20, 1970, now abandoned.

The present invention relates to a systemic miticide containing chloromethanesulfonamide as an active ingredient and a method for controlling mites very effectively, without causing phytotoxicity and saving labor by spreading chloromethanesulfonamide on plants such as vegetables, fruit tree and the like or soil surface or mixing the miticide with soil or spraying a solution dissolved in an appropriate amount of water.

Most commercially available miticides kill mites contactly after spreading them but for this purpose they must be spread throughout the area where mites exist and such a means is very laborious.

The present inventors have found that although the compound to be used in the present invention is low in the contact miticidal activity, it shows a high systemic miticidal activity by applying it on leaves or roots. Namely, the compound to be used in the present invention penetrates and transfers into plant system and consequently mites existing on an area not directly spread can be killed and even if there are some areas where the miticide is incompletely sprayed, the miticidal activity can be satisfactorily attained.

The inventors have paid attention to the very high water solubility of the compound and made various investigations resulting in the discovery that mites can be very effectively killed by applying the compound directly on soil surface, mixing the compound with soil or spraying a solution of the compound in an appropriate amount of water on soil surface.

Most of the conventional miticides must be applied directly on the area where mites exist and therefore it is very laborious to spray the miticides evenly and throughout such an area.

However, according to the method for applying the systemic miticide of this invention, it is possible to apply the miticide conveniently and further since the compound is water soluble, the miticide can be easily absorbed from plants and roots and transfers throughout the plant to develop the miticidal activity, so that there is no fear of unevenness as in a spreading agent. Accordingly, the labor and time can be saved and the use of this compound is very advantageous.

In order that chloromethanesulfonamide is used as a systemic miticide, the acid amide is mixed with an inert carrier (diluent), if necessary, an adjuvant to form into solution, granule, wettable powder, emulsifiable concentrate or dust, which is directly spread on plants or diluted into a proper concentration and then applied. In addition it is possible to apply the miticide to a hole to be planted prior to planting or a binding treatment, plant stem coating or plant stem injecting treatment and the like can be made.

The term "carrier" used herein means vehicles to be used for carrying the active ingredient to a desired area, which may be both solid and liquid.

As the solid carrier, for example, use may be made of various clays, pyrophillite, talc, bentonite, white carbon, kaolin, diatomaceous earth, silica and vermiculite.

As the liquid carrier, for example, use may be made of water, alcohol, acetone, cyclohexanone, fatty acid and fatty acid ester.

As the adjuvant, use may be made of conventional surfactants, such as spreading agent, emulsifier, sticker and wetting agent, to be used for formulating pesticides, for example, polyoxyethylene alkylaryl ether, polyvinyl alcohol, polyoxyethylenesorbitan monooleate, alkyldimethylbenzylammonium chloride, alkylbenzenesulfonate, ligninsulfonate, sulfuric acid ester of a higher alcohol and the like.

In general, pesticides must be formed into a formulation suitable for spreading by adding a carrier, such as solid carrier or liquid carrier, but since the compound of the present invention is easily soluble in water, consequently this compound may be spread directly in an aqueous solution.

The compound of this invention is hardly decomposed by ultraviolet ray, and therefore even if the compound is spread on the soil surface, the compound is stable. The compound is prepared from chloromethanesulfonyl chloride and ammonia, and is a white or pale yellow prism crystal having a melting point of 70–73° C. and is soluble in water or water-soluble solvents, such as alcohol and the like.

When the compound of this invention is used together with ammonium chloride, which is byproduced in the preparation of the compound without separation, the miticidal activity is further improved.

In addition to the byproduced ammonium chloride, the miticidal activity can also be improved by using together with fertilizers, for example, nitrogen fertilizers, such as, urea, ammonium sulfate, ammonium nitrate; calcium superphosphate, potassium phosphate, potassium chloride, potassium nitrate and the like or the composite fertilizers thereof.

The mixture ratio of this compound to the fertilizer, when both activities of fertilizer and miticide are aimed at, is, for example, urea of 5 to 30 kg. and chloromethanesulfonamide of 0.5 to 8 kg. per 10 ares and when only miticidal activity is aimed at, is urea of 0.5 to 3 kg. and 0.5 to 8 kg. of chloromethanesulfonamide per 10 ares.

The merits attained by mixing with the fertilizer in this manner are as follows:

(1) Whenever such a mixture is applied to cultivating field or forest as an initial or supplemental manure, mites can be combatted. Furthermore, for only the purpose of prevention of mites, such a purpose can be accomplished by decreasing the amount of fertilizer. Accordingly, the heretofore complicated and difficult technique and labor for the prevention can be considerably omitted.

(2) The handling in the application is simple and safe, that is, it is merely necessary to effect cultivation or soil covering after applied the mixture over the whole surface of the field to be treated and in some case, the effect can be developed fully even if the soil covering or cultivation is not carried out.

(3) Since the use of water is not required, the mixture is convenient for upland or forest in highland, inclined field or hill where the use of water is inconvenient.

(4) When the mixture is applied in soil, it absorbs gradually water therein and the granules are collapse and therefore the mixture is absorbed favorably from roots and the activity appears rapidly and the effect enhances. The collapse needs a long time and consequently the activity continues for a long period of time.

(5) Chloromethanesulfonamide prevents nitrification and the effect of nitrogen continues for a long period of time and further the miticidal activity can be increased.

(6) No phytotoxicity appears against various useful plants.

(7) Chloromethanesulfonamide permeates and transfers in plant and reaches every part of the plant and accordingly any natural enemy is not damaged.

(8) Ammonium chloride by-produced in the preparation of chloromethanesulfonamide is not necessary to be separated, so that the use of chloromethanesulfonamide is economic.

(9) Particularly, chloromethanesulfonamide is easily blended with urea and therefore the formulation is easy and further the strength of the obtained granule is high.

(10) Chloromethanesulfonamide has a low toxicity, and further it is applied directly to soil. Consequently, the compound can be used safely without public nuisance.

The oral poison $LD_{50}$ of the compound of this invention against male rats is about 400 mg./kg., and the compound is safe to human body. Furthermore, the compound has no phytotoxicity.

The object of this invention can be attained by using 50–500 g./10 ares when the miticide is directly spread on plants, or by using 500 g.–8 kg./10 ares when the miticide is used for treating soil.

The following examples are given in illustration of this invention, but the compounding ratio of the effective ingredient and the additives can be varied in a broad range. In the examples, "%" means percent by weight.

EXAMPLE 1

Granule

20% of chloromethanesulfonamide, 1% of sodium dodecylbenzenesulfonate and 79% of a mixture of acidic bentonite and diatomaceous earth were mixed and milled. The resulting mixture was kneaded with a suitable amount of water, granulated by means of an extrusion granulator and dried to prepare a granular formulation, which was spread.

EXAMPLE 2

Wettable powder

50% of chloromethanesulfonamide, 2% of sodium dodecylsulfate, 2% of polyvinyl alcohol and 46% of a mixture of white carbon and diatomaceous earth were mixed and milled to prepare a wettable powder, which was suspended in water and then used.

EXAMPLE 3

Emulsifiable concentrate

20% of chloromethanesulfonamide, 65% of xylene and 15% of an emulsifier sold by Toho Chemical Industry Co. Ltd. under the trademark Sorpol (a mixture of polyoxyethylene alkylaryl ether, polyoxyethylene fatty acid ester and alkylaryl sulfonate) were mixed and dissolved to obtain an emulsifiable concentrate, which was diluted with water and then sprayed.

EXAMPLE 4

Dust

3% of chloromethanesulfonamide, 30% of talc and 67% of kaolin were mixed and milled to form a dust, which was spread.

EXAMPLE 5

Granule

Into a granulator were charged 90% of powdery urea, and then 10% of melted chloromethanesulfonamide were added to the powdery urea dropwise, while rotating the granulator, to prepare a granular formulation.

EXAMPLE 6

Granule

In a granulator, 20% of powdery urea and 70% of chloromethanesulfonamide were mixed and formed into small granules. At the end of the granulating step, the resulting small granules were covered with 10% of diatomaceous earth to prepare a granular formulation.

EXAMPLE 7

Granule

In a rotary mixer, a mixture of 4.5% of chloromethanesulfonamide, 0.1% of polyoxyethylene laurate, 0.1% of polyethylene glycol and 0.1% of toluene was sprayed on 90.7% of ammonium sulfate while stirring the mixer, and the resulting mixture was mixed homogeneously and formed into small granules. The small granules were covered with 4.5% of diatomaceous earth to prepare a granular formulation.

EXAMPLE 8

Granule

20% of chloromethanesulfonamide, 10% of urea, 10% of white carbon (colloidal silica), 15% of bentonite, 2% of sodium ligninsulfonate and 43% of talc were mixed. The resulting mixture was kneaded with a small amount of water, granulated and dried to prepare a granular formulation.

EXAMPLE 9

Aqueous solution

A mixture of 30% of chloromethanesulfonamide and 10% of urea was dissolved into 60% of water to prepare an aqueous solution.

The miticidal activity of the compound according to the present invention will be explained with the following experimental examples.

EXPERIMENTAL EXAMPLE 1

Test for miticidal activity on citrus red mite when soil is treated with the compound of this invention.

Citrus red mites were put on a young summer orange plant planted in a pot having a diameter of 12 cm. in a greenhouse.

The soil in the pot was treated with the granular formulation prepared in Example 1, in which 22.6 mg. of the compound according to this invention per 1 pot were used. The number of living mites were determined to obtain a result as shown in the following Table 1.

TABLE 1

| Active ingredient | Amount of active ingredient used (kg./10 a) | Number of mites before spreading | Number of living mites after spreading after— | | | | |
|---|---|---|---|---|---|---|---|
| | | | 3 days | 6 days | 10 days | 14 days | 17 days |
| Chloromethanesulfonamide (present invention) | 2 | 181 | 208 | 7 | 1 | 1 | 10 |
| Dimethoate [1] | 2 | 169 | 66 | 3 | 10 | 18 | 21 |
| Non-treatment | | 162 | 229 | 182 | 102 | 85 | 79 |

[1] Trade of dimethyl-S-(N-methylcarbamoylmethyl) dithiophosphate sold by American Cyanamide Co.

EXPERIMENTAL EXAMPLE 2

Test for miticidal activity on citrus red mite.

Citrus red mites were put on a young summer orange plant planted in a pot having a diameter of 12 cm. in a greenhouse.

The wettable powder prepared in Example 2 was diluted with water to prepare a suspension containing the compound of this invention in a concentration of 500 p.p.m. The suspension was sprayed on the summer orange plant in an amount of 30 ml. per 1 pot by means of a spray gun. The number of living mites after the spraying of the suspension was determined to obtain a result as shown in the following Table 2.

TABLE 2

| Active ingredient | Concentration (p.p.m.) | Number of mites before spraying | Number of living mites after spraying after— | | | | | |
|---|---|---|---|---|---|---|---|---|
| | | | 2 days | 4 days | 9 days | 13 days | 17 days | 19 days |
| Chloromethanesulfonamide (present invention) | 500 | 114 | 0 | 0 | 1 | 0 | 4 | 29 |
| Galecron [1] (control) | 500 | 108 | 0 | 0 | 0 | 0 | 15 | 60 |
| Non-treatment | | 159 | 219 | 222 | 129 | 96 | 252 | 291 |

[1] Trademark of N'-(2-methyl-4-chlorophenyl)-N,N-dimethylformamidine sold by Ciba Ltd.

EXPERIMENTAL EXAMPLE 3

Field test for miticidal activity on citrus red mite.

Citrus red mites were put on a two year old young summer orange plant.

The wettable powder prepared in Example 2 was diluted with water to prepare a suspension having a predetermined concentration of the active ingredient, and the suspension was sprayed in an amount of 100 ml. per 1 plant. The number of living mites per 50 leaves of 1 plant after the spraying was determined to obtain a result as shown in the following Table 3.

TABLE 3

| Active ingredient | Concentration (p.p.m.) | Number of mites before spraying | Number of living mites after spraying after— | | | | | |
|---|---|---|---|---|---|---|---|---|
| | | | 2 days | 7 days | 13 days | 20 days | 27 days | 35 days |
| Chloromethanesulfonamide (present invention) | 250 | 368 | 36 | 0 | 0 | 0 | 0 | 0 |
| Morestan [1] (control) | 250 | 245 | 4 | 1 | 0 | 0 | 0 | 0 |
| Non-treatment | | 386 | 411 | 302 | 89 | 61 | 28 | 22 |

[1] Trademark of 6-methyl quinoxaline 2,3-dithiocarbonate sold by Bayer AG.

EXPERIMENTAL EXAMPLE 4

Test for miticidal activity of chloromethanesulfonamide on citrus red mite.

Citrus red mite aduts were put on a young summer orange plant planted in a pot having a diameter of 12 cm. in a greenhouse. The soil in the pot was treated in the following three methods.

(1) Active ingredient of chloromethanesulfonamide is dissolved in 50 ml. of water and the solution is sprayed on the soil in the pot.

(2) The active ingredient is directly spread on the soil surface.

(3) The active ingredient is mixed with the soil thoroughly.

The number of living mites after this treatment was determined to obtain a result as shown in the following Table 4.

TABLE 4

| Active ingredient | Amount of active ingredient used (kg./10 a) | Number of mites before treatment | Number of living mites after treatment after— | | | | | |
|---|---|---|---|---|---|---|---|---|
| | | | 3 days | 5 days | 9 days | 13 days | 15 days | 19 days |
| Chloromethane sulfonamide: | | | | | | | | |
| (1) Spraying to soil | 1 | 32 | 10 | 5 | 2 | 1 | 0 | 0 |
| (2) Soil surface treatment | 1 | 52 | 14 | 2 | 1 | 0 | 0 | 0 |
| (3) Mixing with soil | 1 | 48 | 12 | 4 | 3 | 0 | 0 | 0 |
| Temik [1] granule (10%, control) | 1 | 58 | 21 | 0 | 0 | 0 | 0 | 0 |
| Non-treatment | | 40 | 68 | 83 | 61 | 37 | 40 | 93 |

[1] Trademark of 2-methyl-2-(methylthio) propionaldehyde, o-(methylcarbamoyl) oxime sold by Union Carbide Corp.

As seen from the above Table 4, the above three treating methods show a high activity which is not inferior to that of the control miticide, and do not show any phytotoxicity.

EXPERIMENTAL EXAMPLE 5

Test for miticidal activity of chloromethanesulfonamide on carmine mite.

Carmine mite adults were put on a young egg-plant planted in a pot having a diameter of 12 cm. in a greenhouse. The soil in the pot was treated in the following three methods.

(1) Active ingredient of chloromethanesulfonamide is dissolved in 50 ml. of water and the solution is sprayed on the soil in the pot.

(2) The active ingredient is directly spread on the soil surface.

(3) The active ingredient is mixed with the soil thoroughly.

The number of living mites after this treatment was determined to obtain a result as shown in the following Table 5.

TABLE 5

| Active ingredient | Amount of active ingredient used (kg./10 a) | Number of mites before treatment | Number of living mites after treatment after— | | | | | |
|---|---|---|---|---|---|---|---|---|
| | | | 3 days | 5 days | 9 days | 12 days | 15 days | 18 days |
| Chloromethanesulfonamide: | | | | | | | | |
| (1) Spraying to soil | 2 | 89 | 37 | 0 | 0 | 0 | 0 | 1 |
| (2) Soil surface treatment | 2 | 26 | 5 | 1 | 0 | 0 | 0 | 0 |
| (3) Mixing with soil | 2 | 42 | 17 | 1 | 0 | 0 | 0 | 0 |
| Temik granule (10%, control) | 2 | 34 | 1 | 0 | 0 | 0 | 0 | 0 |
| Non-treatment | | 53 | 87 | 71 | 79 | 67 | 107 | 120 |

As seen from the above Table 5, the above three treating methods show a high activity which is not inferior to that of the control miticide, and does not show any phytotoxicity.

EXPERIMENTAL EXAMPLE 6

Test for miticidal activity of chloromethane-sulfonamide mixed with fertilizer on carmine mite.

Carmine mite adults were put on a young egg-plant planted in a pot having a diameter of 12 cm. in a greenhouse. The soil in the pot was treated with chloromethanesulfonamide mixed with fertilizers.

The number of living mites after this treatment was determined to obtain a result as shown in the following Table 6.

As seen from the Table 6, the miticidal activity of chloromethanesulfonamide used with fertilizers is superior to that of chloromethanesulfonamide not combined with fertilizers.

What is claimed is:

1. A method for controlling mites, which comprises applying a miticidally effective amount of chloromethanesulfonamide directly to mites.

TABLE 6

| Chemical | Amount of active ingredient used (kg./10 a) | Number of mites before treatment | Number of living mites after treatment after— | | | |
|---|---|---|---|---|---|---|
| | | | 4 days | 6 days | 15 days | 30 days |
| Chloromethanesulfonamide | 1 | 32 | 18 | 6 | 0 | 0 |
| Chloromethanesulfonamide plus Ammonium chloride | 1 / 1 | 90 | 10 | 2 | 0 | 0 |
| Chloromethanesulfonamide plus Urea | 1 / 1 | 65 | 12 | 1 | 0 | 1 |
| Chloromethanesulfonamide plus Ammonium sulfate | 1 / 1 | 52 | 9 | 2 | 1 | 0 |
| Chloromethanesulfonamide plus Ammonium chloride | 1 / 0.3 | 46 | 5 | 1 | 2 | 0 |
| Chloromethanesulfonamide plus Urea | 1 / 15 | 58 | 8 | 3 | 5 | 0 |
| Chloromethanesulfonamide plus Ammonium sulfate | 1 / 30 | 69 | 11 | 1 | 4 | 1 |
| Ammonium chloride | 0.3 | 49 | 60 | 71 | 81 | 68 |
| Urea | 15 | 38 | 82 | 77 | 81 | 50 |
| Ammonium sulfate | 30 | 46 | 78 | 72 | 82 | 96 |
| Non-treatment | | 76 | 92 | 88 | 97 | 102 |

References Cited

El-Hewehi et al., J. Prakt. Chem. 16 No. 5–6, pp. 297–336 (1962).

JEROME D. GOLDBERG, Primary Examiner.

A. J. ROBINSON, Assistant Examiner

U.S. Cl. X.R.

424—Dig. 8